US012761458B2

(12) United States Patent
Thomas

(10) Patent No.: US 12,761,458 B2
(45) Date of Patent: Oct. 13, 2026

(54) MICROSCOPE FOCUS CONTROL SYSTEM

(71) Applicant: Cairn Research Limited, Faversham (GB)

(72) Inventor: Martin Thomas, Faversham (GB)

(73) Assignee: Cairn Research Limited, Faversham (GB)

( * ) Notice: Subject to any disclaimer, the term of this patent is extended or adjusted under 35 U.S.C. 154(b) by 444 days.

(21) Appl. No.: 18/236,926

(22) Filed: Aug. 22, 2023

(65) Prior Publication Data

US 2024/0069319 A1 Feb. 29, 2024

(30) Foreign Application Priority Data

Aug. 24, 2022 (GB) ..................................... 2212300

(51) Int. Cl.
*G02B 21/24* (2006.01)

(52) U.S. Cl.
CPC .................................. *G02B 21/245* (2013.01)

(58) Field of Classification Search
CPC ................................ G02B 21/245; G02B 7/09
USPC .......................................................... 359/383
See application file for complete search history.

(56) References Cited

U.S. PATENT DOCUMENTS 5,359,455 A * 10/1994 Oishi ................. G02F 1/13362 359/489.09
5,396,061 A * 3/1995 Taniguchi ......... G11B 11/10595
2003/0053397 A1* 3/2003 Katayama ............ G11B 7/1365 369/112.17
2010/0007953 A1* 1/2010 Pan ...................... G02B 27/286 359/485.01
2017/0059842 A1* 3/2017 Kaneki ................ G02B 21/245
2020/0341256 A1* 10/2020 Fahrbach ........... G02B 21/0032
2022/0091406 A1* 3/2022 Ohrt .......................... G06T 7/73
2022/0390367 A1* 12/2022 Steiner ................... G02B 21/16

FOREIGN PATENT DOCUMENTS

JP 2004325482 A * 11/2004

OTHER PUBLICATIONS

JP-2004325482-A—English translation—Nov. 2004—Amano—JP.*

* cited by examiner

*Primary Examiner* — Sharrief I Broome
(74) *Attorney, Agent, or Firm* — SZDC Law PC

(57) ABSTRACT

There is provided a microscope focus control system including an illumination source (70) and a polarization-sensitive detector (66) positioned to receive a reflected beam (40) from an interface (54) having a reference refractive index and configured to detect polarization components of the reflected beam (40). An elongate aperture (72) is disposed proximal the illumination source (70) to generate a rectangular beam (74) to impinge on the interface (54) and a second aperture (106) is located at a position corresponding to an unfocused region of the reflected beam (40) from the interface (54) so as to direct unfocused reflected light onto the polarization-sensitive detector (66). Changes in polarization components of the reflected beam are used to measure of change in position of the interface (54) relative to the objective (50). The reflected beam (40) is generated by Fresnel reflection.

17 Claims, 7 Drawing Sheets

MICROSCOPE FOCUS CONTROL SYSTEM

This application claims priority to United Kingdom Patent Application No. GB 2212300.4, filed on Aug. 24, 2022, which is incorporated by reference for all purposes as if fully set forth herein.

FIELD OF THE INVENTION

This invention relates to a microscope focus control system for the fast measurement and control of image focus in microscopy.

BACKGROUND TO THE INVENTION

The ability of an optical system to recognise or maintain a particular focus position with respect to a series of objects at different distances is often a very important requirement, and many ways of doing so have been developed over the years. In a microscope, images are viewed at a very high magnification, of perhaps 100 or more, which means that very small changes in object distance of the micrometre scale resulting from mechanical instabilities in the optical system can be sufficient to significantly change the focus.

With the increasing prevalence of electronic methods of image acquisition, the possibilities of processing such images to automatically determine and set what is likely to be the "best" focus are being exploited, but processing of signals from an array or imaging detector can impose a significant computational overhead and slow the speed at which the focus can be adjusted to compensate for the movement. Furthermore, the design of such systems may require them to be physically integrated within the design of the microscope itself

SUMMARY OF THE INVENTION

In accordance with the invention there is provided a microscope focus control system for monitoring changes in the position of a microscope objective comprising an illumination source emitting any radiation used in microscopy, for example visible light, ultra-violet or infra-red radiation, and a polarization-sensitive detector positioned to receive a reflected beam from an interface having a reference refractive index, such as a glass cover slip placed over a specimen, and configured to detect polarization components of the reflected beam, wherein an elongate aperture is disposed proximal the illumination source to generate a rectangular beam to impinge on the interface and a second aperture is located at a position corresponding to an unfocused region of the reflected beam from the interface so as to direct unfocused reflected light onto the polarization-sensitive detector, such that changes in polarization components of the reflected beam are used as a measure of change in position of the interface relative to an objective.

The reflected beam is preferably generated by Fresnel reflection from the interface.

Changes in polarization components, and thus the s and p components, in the reflected beam may be used to generate signals to control movement of microscope equipment and thereby to maintain the interface and objective at fixed distance with respect to each other, and so to restore focus when movement has occurred away from a focused position. Typically this is performed by using a z-axis drive and associated controller to move the objective.

The position corresponding to the unfocused region where the second aperture is located is preferably further from the polarization-sensitive detector than a position corresponding to a focused region of the reflected light, i.e. the focal point of the reflected light.

An illumination beam from the illumination source may be polarized to control relative contributions of s and p components within the illumination source.

The illumination source is preferably a laser diode and may generate wavelengths in the infra-red.

The interface is preferably an uncoated glass coverslip as is used to cover a microscope sample mounted on a glass slide.

If desired, a magnifying lens may be disposed between a focal point of the reflected beam and the polarization-sensitive detector so as to increase magnification and so increase sensitivity.

The polarization-sensitive detector is preferably locatable proximal an imaging sensor associated with a microscope. Alternatively a dichroic mirror or other optical splitter element may be positioned between the interface and the polarization-sensitive detector so as to allow reflected light to be separated from imaging light resulting from a microscope imaging source and thus allowing for separation of the polarization-sensitive detector and microscope image plane.

The illumination source may be of a different wavelength to an imaging source associated with a microscope with which the system is to be used.

The system may further comprise a feedback control system or controller responsive to changes in polarization components of the reflected beam to maintain a constant distance between an objective and the interface.

The system may further comprise an actuator, such as a z-axis drive, moveable responsive to changes in polarization components of the reflected beam to maintain a constant distance between an objective and the interface so as to restore original distance and focus position between objective and interface.

The microscope focus control system as aforesaid is suitable for retrofitting to a microscope system.

The invention also lies in a microscope system incorporating a microscope focus control system as aforesaid.

The invention will now be described by way of example and with reference to the accompanying drawings in which:

FIGS. 1 (*a*) and (*b*) show schematics of a camera and a microscope for explanatory purposes;

Figure 7:
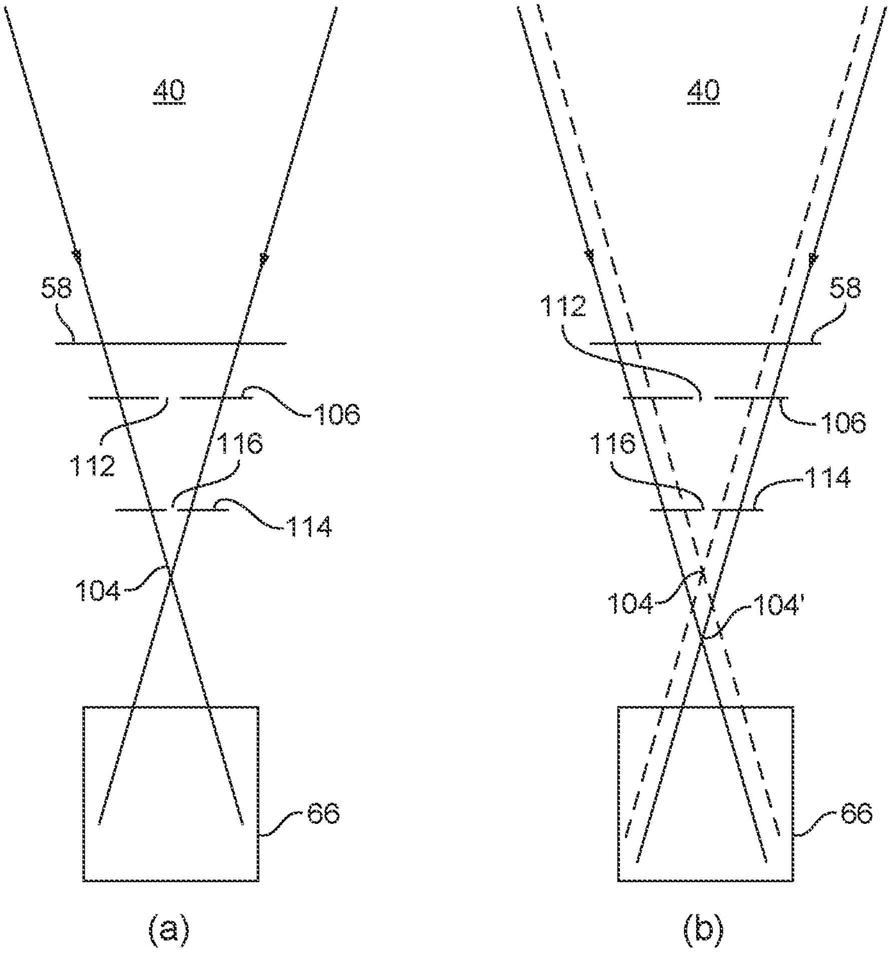
Figure 8:
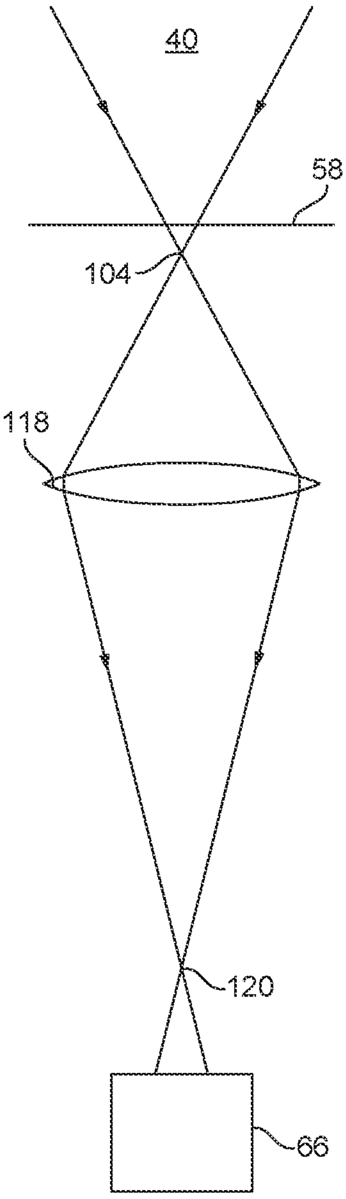

FIGS. 7 (*a*) and (*b*) show for explanatory purposes an area proximal to the polarization-sensitive detector;

FIG. 8 shows a modification of the microscope focus control system; and

Figure 9:
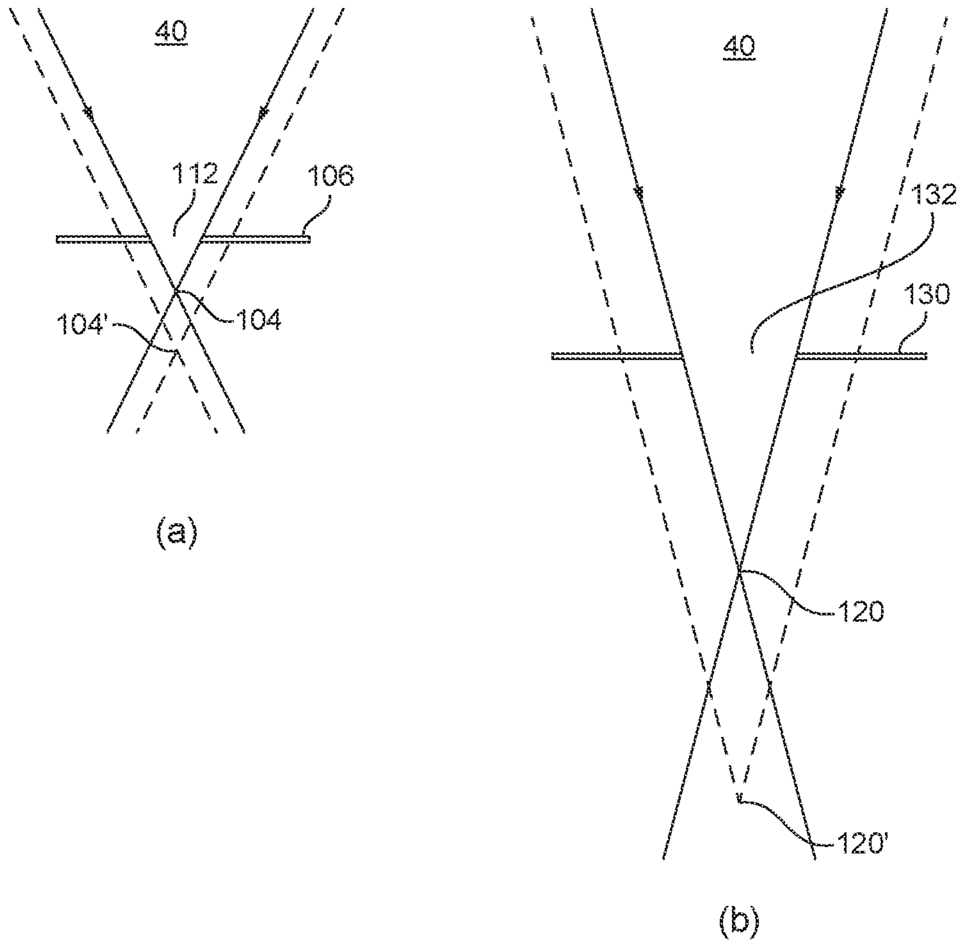

FIGS. 9 (*a*) and (*b*) show for explanatory purposes an area proximal to an aperture associated with the polarization-sensitive detector.

DESCRIPTION

The underlying difference between two major imaging applications of a camera and a microscope is shown in FIGS.

1(*a*) and (*b*) respectively. In both applications, the optical system, represented here for simplicity as just a single lens, collects light from some object or group of objects, to produce an image. However, objects at different distances from the lens would be focused to give images at different distances, so when simultaneously imaging objects at different distances, both objects cannot both be in sharp focus at the same time, with one having a focused image and one having an out-of-focus blurred image.

Figure 1:
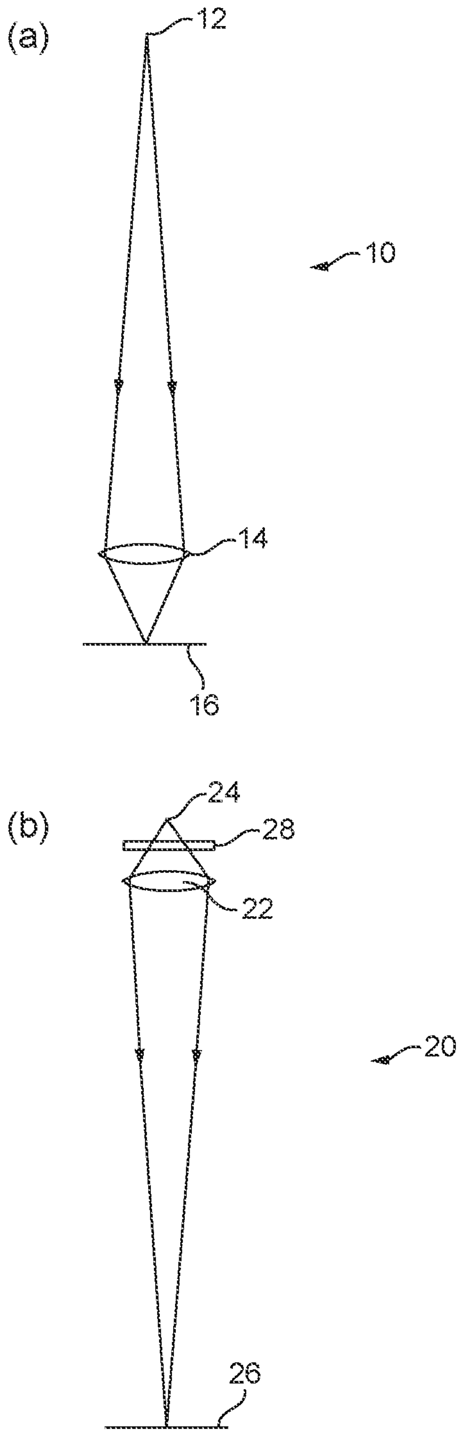

The extent of the out-of-focus blur depends on the optical aperture of the system, which is a measure of the range of angles over which the system lens can collect light from an object. In the application of a conventional camera system 10 as is shown in FIG. 1(*a*), this range is typically quite small, as objects 12 tend to be relatively far away from lens 14, so although the focus may need to be adjusted to achieve the best overall compromise for a given situation, in practice objects at a reasonable range of distances can simultaneously be brought to an acceptable focus at image plane 16.

However, in the field of microscopy, the situation is very different. For a microscope 20 as shown in FIG. 1(*b*), lens 22 is very much closer to object(s) 24 than it is to the image on image plane 26. The proximity of the object, which is frequently a specimen in an aqueous medium, to lens or objective 22 means that there is generally an intervening glass coverslip 28, which serves both to protect objective 22 and to prevent the specimen from drying out while being viewed. For such a microscope, light is collected over a much larger range of angles than for camera 10 as lens 22 is closer to object(s) 24, so the out-of-focus blur for objects at different distances is correspondingly greater. Also the images are being viewed at very high magnification, of perhaps 100 or more, which means that even very small changes of micrometers in object distance resulting from mechanical instabilities in the system can be sufficient to change the focus significantly. As such it is desirable to detect any focus drift from small movements and to correct it as soon as possible.

The invention enables focus monitoring and control for a microscope and is based on the angular polarization dependence of the reflection from a refractive index interface, known as Fresnel reflection. The general principle of Fresnel reflection will now be explained.

Figure 2:
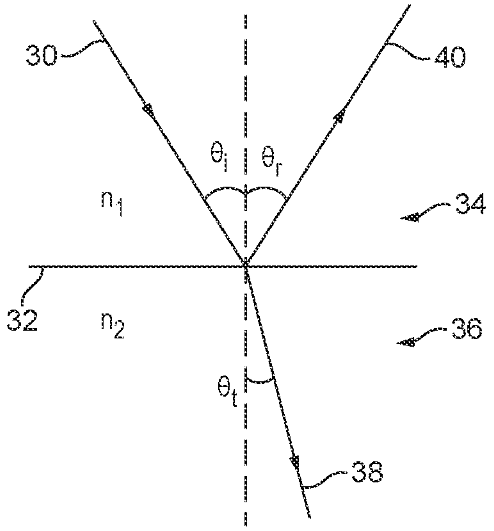
FIG. 2 shows an optical diagram illustrating transmission and reflection in relation to an interface.

As shown in FIG. 2, whenever light 30 encounters a refractive index interface 32, as it will do when transmitted through any optical component, its angular direction will change. For a given angle of incidence $\theta_i$ from a first medium 34 of refractive index $n_1$, air in this example, into a second medium 36, typically glass, of higher refractive index $n_2$, the majority of light 30 will be transmitted through second medium 36 as light beam 38 at a new angle $\theta_t$ according to Snell's law, such that $$n_1 \sin \theta_i = n_2 \sin \theta_t \qquad \text{Equation 1}$$

However, some fraction of incident light 30 will instead be reflected as beam 40 at an angle $\theta_r$, where $$\theta_r = -\theta_i \qquad \text{Equation 2}$$

and it is this light 40 undertaking Fresnel reflection which is utilised in the present invention.

If the angle of incidence $\theta_i$, is large, the Fresnel reflected light 40 shows a substantial dependence on the polarization state of the incident light. Whether explicitly polarized or not, light can be viewed as a mixture of two mutually perpendicular polarization components, termed s when the electric vector is at right angles to the refractive index interface, and p when the electric vector is parallel to it. "Unpolarized" light can be viewed as having equal s and p components.

For Fresnel reflection at incident angles $\theta_i$ of less than about 10°, the reflected intensity r is essentially polarization independent when it approximates to $$r_{tot}^2 = [(n_1 - n_2)/(n_1 + n_2)]^2 \qquad \text{Equation 3}$$

where $n_1$ and $n_2$ are the refractive indices on either side of interface 32. In the typical case of an air-uncoated glass interface such as encountered when a specimen is mounted on a slide and a glass slip cover is placed over the specimen, the refractive index of air $n_1$ is 1 and the glass slip value $n_2$ is approximately 1.5, which means that about 4% of the light is reflected.

The reflection becomes progressively more polarization-dependent as the angle of incidence $\theta_i$ increases, and the following relations for the reflected intensities $r_s$ and $r_p$ of the s and p components apply:

$$r_s^2 = \sin^2(\theta_i - \theta_t)/\sin^2(\theta_i + \theta_t) \qquad \text{Equation 4}$$

and $$r_p^2 = \tan^2(\theta_i - \theta_t)/\tan^2(\theta_i + \theta_t) \qquad \text{Equation 5}$$

where $\theta_i$ and $\theta_t$ are the incident and transmitted angles at interface 32 as shown in FIG. 2.

Figure 3:
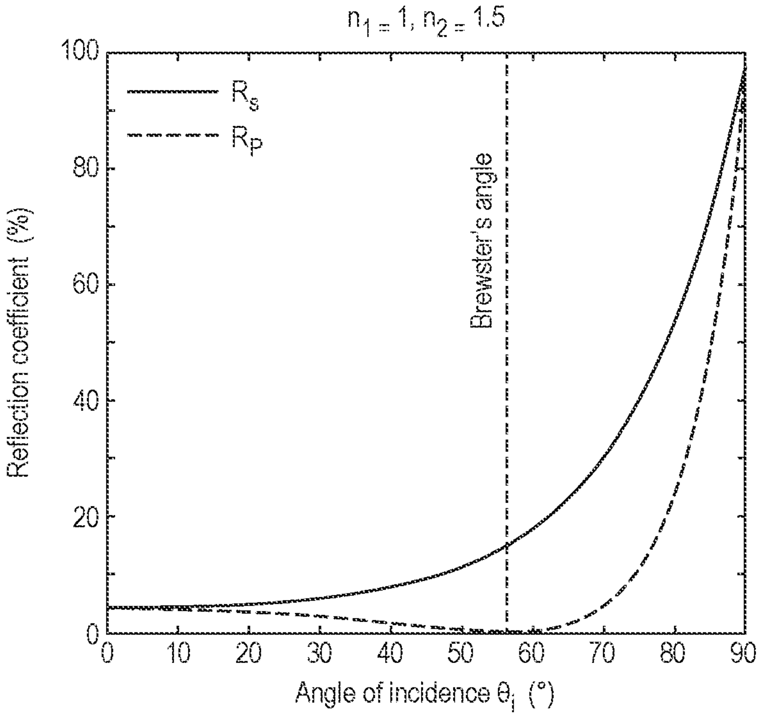
FIG. 3 shows a graph illustrating reflection of a beam as compared to angle of incidence.

These relations are effectively identical for small angles of incidence, because of the increasing equivalence of the sine and tangent functions, but for larger angles the difference may be substantial, as shown in FIG. 3 for reflection from an air-glass interface.

FIG. 3 shows that as the angle of incidence $\theta_i$ increases beyond about 10°, the reflection of s polarized light progressively increases, whereas that of p polarized light reduces towards zero at "Brewster's angle", which for an air: glass interface occurs at an incidence angle $\theta_i$ of around 55°, and then increases again as $\theta_i$ becomes even more extreme.

By using a polarization-sensitive detector to measure the relative intensities of the s and p components of beam 40 that is reflected from an air: glass interface 32, which in this case will be the coverslip between the objective and the specimen, information can be gained about the incident angle $\theta_i$ of incident light 30. Such a detector typically consists of a polarizing beam splitter that separates and directs the s and p components of Fresnel light 40 to a pair of sensors, typically photodiodes, that allow the individual intensities of the s and p components to be independently and rapidly measured. Whilst a Fresnel reflection is particularly preferred, any other form of reflection with sufficient polarization dependence could be utilised for focus control, for example specular reflections from a mirrored metallic surface exhibit polarization dependence as the incident light goes off axis.

Figure 4:
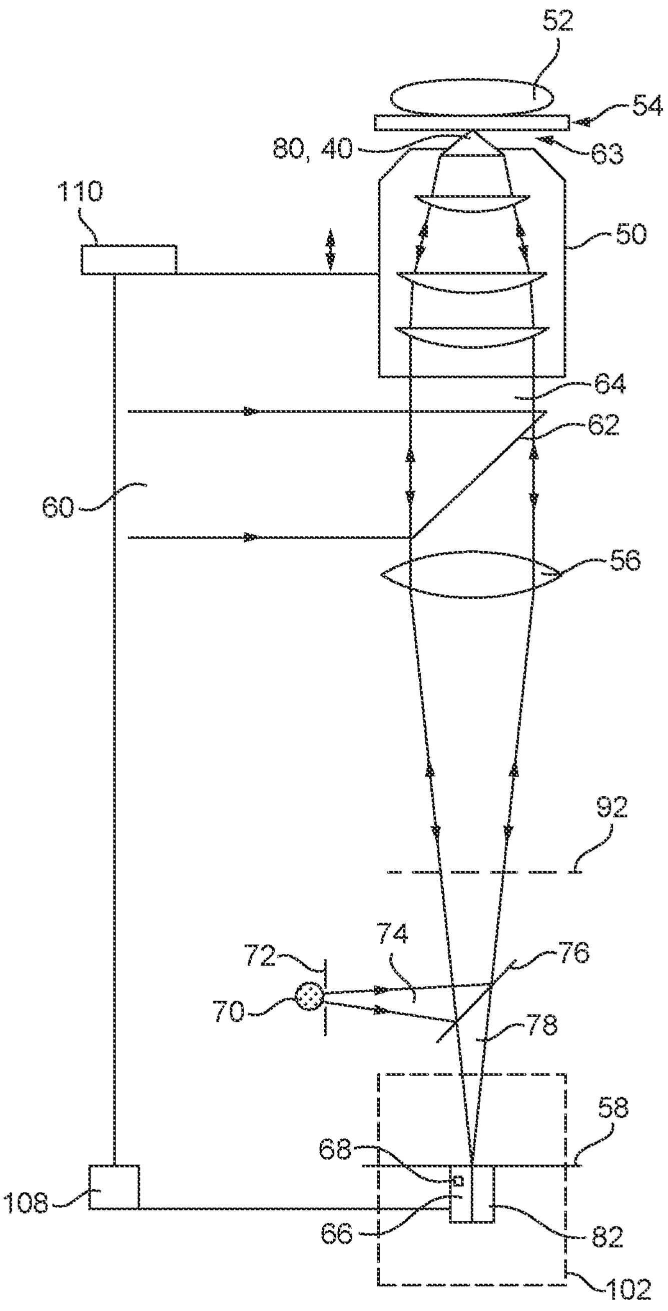
FIG. 4 shows a schematic diagram of a microscope incorporating a microscope focus control system in accordance with the invention comprising a polarization-sensitive detector.

Such a polarization-sensitive detector can be used as the basis for a microscope focus control system as shown in FIG. 4 where reflections from an interface with a known refractive index, such as a glass coverslip 54, are used to detect changes in focus. The main microscope structure comprises objective 50 comprising multiple lenses and which collects the light from specimen 52 and its associated coverslip 54, "tube lens" 56 which refocuses the light to form an image on (or near) optical plane 58, and a collimated light source 60 directed towards specimen 52 by 45° mirror 62. In a traditional microscope the image is viewed by an eyepiece, but the image can also be viewed directly from a camera or other imaging device at image plane 58.

Although objective 50 typically has many elements with optical surfaces within it, these are generally coated with anti-reflective coatings. As shown by the ray paths in FIG. 4, light incident on these elements experiences only relatively small angles of incidence. Hence there will be relatively little polarization dependence of whatever reflections may occur from these elements and thus no Fresnel contribution from these elements. This greatly contrasts with the situation at specimen 52, where there is typically an air interface 63 between objective 50 and coverslip 54. For some objectives, the intervening medium between the objective and the coverslip may be oil rather than air, in which case there will be relatively little refractive index difference at that interface. However, in this case the refractive index difference across the interface between the specimen and the specimen side of the coverslip can be used instead. The Fresnel reflection at coverslip 54 occurs at an average angle for which the relative values of the s and p polarization components are significantly different.

If the distance between objective 50 and coverslip 54 changes, then the focus position of reflected beam 40 also changes, and this in turn changes the amplitude and the s:p polarization ratio of the signal reaching polarization-sensitive detector 66.

Accurate focus stability and control is important when imaging at high magnifications, such as for a microscope, as very small changes in object distance can substantially degrade the focus. Where an object moves to a slightly different distance from the objective, for example by vibration, the object's image will also move to a different distance from the tube lens, but this difference is much greater as it is given by the difference in object position multiplied by the square of the magnification. This is as a result of the longitudinal magnification of the microscope.

To direct light into objective 50 and illuminate sample 52, 45° mirror 62 is used to reflect collimated beam 60 into space 64 between objective 50 and tube lens 56. The most common application is the excitation of fluorescence within the specimen where the fluorescence emission will be at longer wavelengths than the wavelength of beam 60. Mirror 62 is chosen to have properties such that these longer wavelengths are transmitted rather than reflected.

To detect the changes in focus position using Fresnel reflections, a microscope focus control system comprising polarization-sensitive detector 66, illumination source 70, slit 72, aperture 106 and additional lenses and mirrors as required are incorporated into the microscope structure as shown in FIGS. 4, 5, 7 and 8, whether on manufacture of a microscope or by retro-fitting external to an existing microscope. By detecting changes in the s:p polarization ratio of the detected Fresnel signal using a pair of photodiode sensors 68 within detector 66, changes in focus position can be adjusted for.

Figure 5:
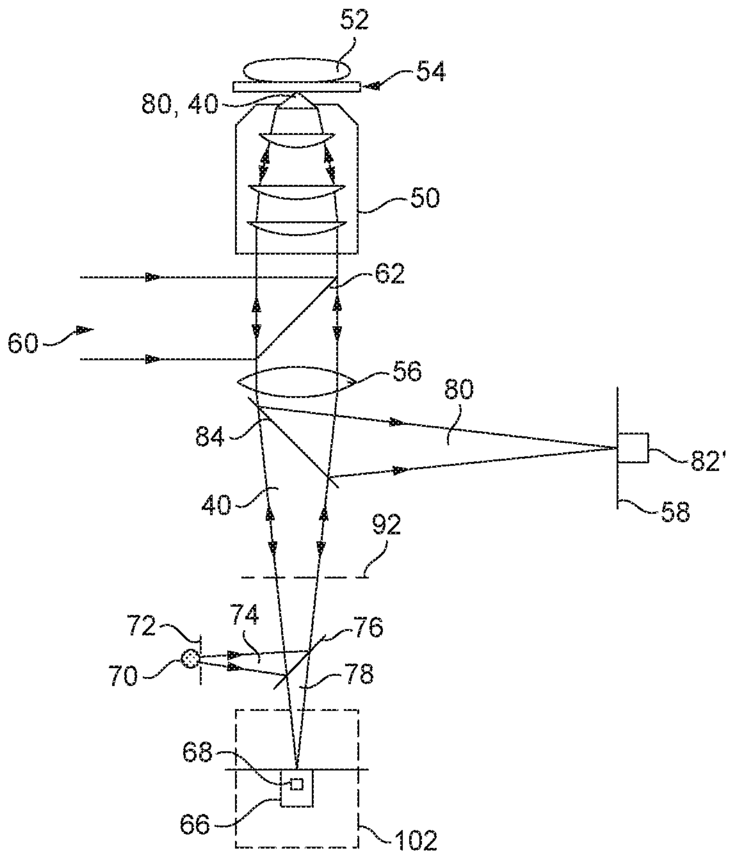
FIG. 5 shows a schematic diagram of a second arrangement of a microscope incorporating a microscope focus control system in accordance with the invention

FIGS. 4 and 5 show illumination source 70 as a point source of a diverging beam, for which the optical design will be of no difficulty to anyone experienced in the art so further details are not shown. Light from source 70, after reflection from coverslip 54, is brought to a focus point near polarization-sensitive detector 66, which is near the microscope image plane 58 where light 80 emitted from sample 52 forms an image of sample 52. As drawn in FIG. 4, this focus point will be at the centre of image plane 58, but it can be focused to other locations on this plane by moving illumination source 70 and detector 66 with respect to the optical axis of objective 50 and tube lens 56.

To ensure mirror 76 does not obstruct detection pathway 78 for reflected beam 40, mirror 76 is selected to reflect only a small proportion of the reflected light 40 resulting from illumination source 70, so that mirror 76 is largely transparent for detection. The illumination efficiency will be correspondingly reduced, but can be compensated for by using a more powerful beam, such as that from a laser diode.

For clarity, FIG. 4 shows only the most extreme angles of the beam that travels from light source 70, is focused onto coverslip 54 by tube lens 56 and objective 50, then partially reflected by coverslip 54, and then refocused by objective 50 and tube lens 56 to produce a further image at or near polarization-sensitive detector 66. However, these angles define an envelope containing rays at all smaller angles.

In a practical system, polarization-sensitive detector 66 cannot share the same physical space as imaging sensor 82, which also normally needs to be located at image plane 58. These two components can be located side-by side, as shown in FIG. 4, so that they see different parts of the microscope field. This gives a free choice of wavelengths for illumination beam 74. Alternatively as shown in FIG. 5, a wavelength-selective or dichroic mirror 84 is disposed between tube lens 56 and detector 66 to allow the two optical pathways, i.e. the pathway from imaging beam 80 representing the microscope image of sample 52 and the pathway for reflected beam 40, to be imaged independently over different wavelength ranges and to direct reflected light resulting from beam 80 to imaging sensor 82'. The position of detector 66 is thus separated from the position of image plane 58 and imaging sensor 82'. In this case illumination beam 74 is likely to be at infra-red wavelengths, where imaging information is likely to be of much less interest, and for which mirror 84 is transparent, whereas it reflects the shorter-wavelength imaging light 80 derived from beam 60 to imaging sensor 82', which is typically a camera or electronic imaging device associated with the microscope.

Some microscopes offer a more extended collimated space between objective 50 and tube lens 56 which instead allows mirror 84 to be located in the space between mirror 62 and tube lens 56, although then a second tube lens is needed between mirror 84 and imaging sensor 82' in order to focus beam 86 onto the sensor 82'.

Figure 6:
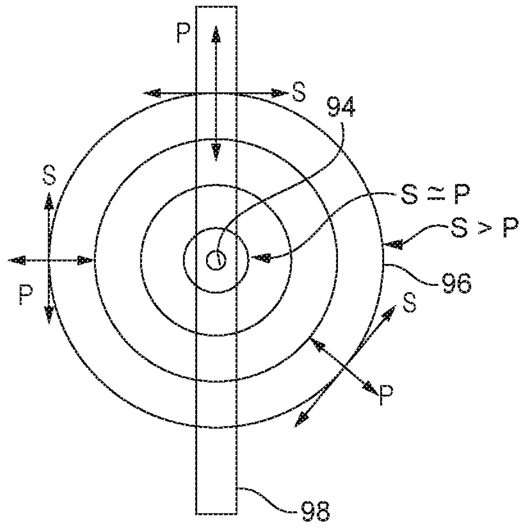
FIG. 6 shows a cross-section through a circular beam to illustrate polarization components.

FIGS. 4 and 5 are conventional optical diagrams along what is by convention described as the yz axis, whereas FIG. 6 represents a transverse (xy) view of beam 40 at some arbitrary point 92 on its way to form the image near detector 66, with beam diameter differing according to its distance away from the focus point of beam 40. Beam at point 92 is shown as a series of concentric circles, where the smaller diameters represent light that has been reflected from coverslip 54 at smaller angles, with a low $\theta_i$ and the larger diameters represent light that has been reflected at larger angles, with a higher $\theta_i$. Referring back to FIG. 3, central portion 94 of beam 40 generated from a low $\theta_i$ has very similar s and p polarization contributions, whereas the more peripheral regions such as 96 have progressively lower p contributions on account of their higher reflection angles.

There is a potential problem in respect of discriminating between what is s and what is p at polarization-sensitive detector 66 compared with at the reflection interface if illumination is with a circular beam. This is because for light arriving at and then leaving coverslip 54 at some angle to the optical axis as shown in FIGS. 4 and 5, then that angle (the "yz" angle) corresponds to the diameter of a given circle in FIG. 6. For a given point on that circle, the p s polarization component corresponds to the tangent to that point, whereas the s p polarization component is radial with respect to it. However, detector 66 will analyse beam 40 in respect of its s and p components as received at detector 66, and for which the discrimination will be on the basis of its horizontal and vertical components (the x and y co-ordinates). Therefore there can be no polarization sensitivity, regardless of how polarization-sensitive detector 66 is orientated.

It is to address this potential problem, narrow rectangular slit 72 is incorporated within illumination light source 70 to create a beam in the form of a narrow rectangular sheet 98 instead of a circular beam, with the limits of beam 98 shown by the boxed outline in FIG. 6. This now uniquely defines the s and p polarization states at coverslip 54 with respect to detector 66, in that the p state corresponds to light polarized in a direction parallel to the long axis of sheet 98, and the s state corresponds to light polarized in a direction parallel to the short axis of sheet 98. Point images will still be formed at coverslip 54 and at, or near, polarization-sensitive detector 66, but with the angular illumination range restricted to a sheet 98 as shown by the slit outline in FIG. 6.

When the distance between objective 50 and coverslip 54 changes, then the focus position of reflected beam 40 also changes, and this changes the s:p polarization ratio of the signal received by sensors 68 within polarization-sensitive detector 66. FIG. 7 is now used to explain this by way of example showing a greatly magnified ray path diagram for the region enclosed by box 102 of FIG. 4 and with the convergence of reflected beam 40 exaggerated for greater clarity. FIG. 7 shows reflected beam 40 coming to a focus position 104 in the region near polarization-sensitive detector 66, with detector 66 and focus position 104 near image plane 58 representing the focus position of the sample image. Detector 66 receives part of beam 40, with the light reaching detector 66 being defined by a nearby diaphragm 106 with an aperture 112, with polarization-sensitive detector 66 being sufficiently large and/or close to diaphragm 106 to receive all the light that passes though aperture 112.

If beam 40 were fully in focus at aperture 112, then there would initially be no change in the signal received by detector 66 if the distance between objective 50 and coverslip 54 were to change. Then beyond some change threshold, the detected signal would be reduced, but that by itself would give no information on its polarity. Therefore, instead beam 40 is configured to be out of focus at aperture 112 by ensuring focus point 104 is not coincident with aperture 112, which ensures that a change in the distance between objective 50 and coverslip 54 either increases or decreases the focus and so gives the polarity of the focus shift. The out-of-focus region selected for the location of diaphragm 106 can in principle be on either side of image plane 58, but in practice the nature of the specimen and the optical properties of the objective with respect to out-of-focus light may favour one side or the other. Also the distance of the detector assembly, and in particular diaphragm 106 and aperture 112, in respect of its distance from tube lens 56, can be chosen to give an offset between the distance into the specimen to be monitored and stabilised, and the distance to the reflection point at the air: glass interface of coverslip 54.

For FIG. 5, similarly an apertured diaphragm is located at an out-of-focus position of beam 40, although image plane 58 is located along a different pathway for this particular implementation.

As the reflected Fresnel beam 40 goes out of focus at aperture 112, the more peripheral regions of beam 40, which are relatively deficient in the p polarization component as shown in FIG. 6, are occluded by aperture 112 first. Therefore, the amplitude and also the s:p polarization ratio of the beam signal reaching detector 66 will change. A detector using the relative amplitude of the s signal and the p signal has the advantage of being relatively insensitive to fluctuations from other causes, such as any instability in the intensity of illumination beam 74, or any other changes in the efficiency of beam transmission to polarization-sensitive detector 66. Nevertheless, if desired the total detected intensity can also be used to give useful focus information.

Reflections from other surfaces in the optical system, for example within objective 50, will be at close to normal incidence. Not only are these other surfaces likely to be coated to reduce such reflections, but also all these reflections will have essentially equal s and p contributions and their signal components will cancel. Conversely, the reflections from uncoated coverslip 54 occur at much higher angles, and so their s and p contributions can be significantly different.

One way of measuring the s:p polarization ratio is to divide the s component signal into the p component signal but this either requires calculations in software or specialist analogue circuitry. Alternatively, and as preferred for the present embodiments, two signals representing the s and p components of the reflected beam can be made effectively identical when the sample is at focus, then any changes in focus can be quantified by subtracting one of the signals from the other to give a small residual signal used to control a feedback system, resulting in a faster and more accurate way to measure a small change in the ratio of these components.

Thus at a particular focus position, the relative gains in feedback control signals generated in response to the s and p signals within reflected beam 40 are adjusted so that the gains are made the same and a feedback baseline is created such that when one gain signal is subtracted from the other, there is a zero difference signal. Any shift in focus will generate a residual feedback signal, which will vary according to the degree of focus shift and change in the s and p polarization components. This feedback signal can be used as a measure of the change in focus, or it can be used in an electromechanical feedback loop to restore the focus to its original position. In this type of feedback control system, the residual signal is sent to a controller that moves objective 50 in such a direction as to drive the residual signal back towards zero, and hence to restore the focus. Alternatively, deliberate offset signals can be introduced into the feedback loop, to move the objective to other focus positions, in order to acquire a "z stack" of images at different focus positions through the sample.

Thus any change in focus causes an immediate change in the signal recorded by polarization-sensitive detector 66, and this change is immediately converted by controller 108 into a feedback signal to adjust z-axis drive 110 and the position of objective 50 relative to coverslip 54 in order to restore the focus. Controller 108 and z-axis drive 110 have been omitted from FIG. 5 for clarity. Furthermore, z axis drive system 110 for moving objective 50 is also likely to be controllable by external signals in a linearly quantifiable way. Hence by switching off the feedback signal from controller 108, and instead applying signals to move objective 50 relative to specimen 52 by known distances, the consequent changes in the signal recorded by polarization-sensitive detector 66 can be calibrated in relation to these distances. This allows the operation of the system when under feedback control to be properly quantified.

The illumination level of light 70 is typically set so that the detected s and p signals are sufficiently above the system background noise to provide fast and sensitive operation, while at the same time being no higher than necessary to achieve this, in order to minimise undesirable effects such as the risk of overloading polarization-sensitive detector 66, or of illumination signal 74 breaking into the imaging pathway. This can be achieved by automatically setting the illumination level to achieve this optimum condition when the system is switched on, and then subsequently controlling it with respect to this reference level.

Microscopes are fundamentally high magnification devices and when a shift occurs between the relative position of the objective and the sample, for example by mechanical vibrations affecting a sample stage, a change in the relative position will result in a change in the image position by the change in relative position multiplied by the square of the magnification. Thus a small change in distance at objective 50 causes a large shift in the focus position of the image. It is for this reason that accurate focus stability and control is particularly important when imaging at high magnifications, as very small changes in object distance can substantially degrade the focus.

Considering a specific example of a microscope with a ×40 objective of NA (numerical aperture) 1.4, the angular range of a beam focused at image plane 58 is the inverse sine of the NA of the objective, divided by its magnification, hence plus and minus 2.0°. The focal length of tube lens 56 that produces the image at image plane 58 is typically between 165 and 200 mm, and FIG. 7 uses 200 mm as the focal length. The signal reaching polarization-sensitive detector 66 is defined by aperture 112, of size and position such that some proportion of the light is lost. Note that since the transverse profile of the beam is a narrow sheet rather than circular, for the reasons previously described, the light loss relative to the aperture is a linear rather than a square-law one. This gives us a choice of sizes and positions for diaphragm 106 and aperture 112, with two alternatives 106, 112 and 114, 116 shown as examples in FIG. 7(*a*).

FIG. 7(*a*) shows the situation before a focus shift. Assuming the distance from the reflection point at coverslip 54 to objective 50 reduces by just one micrometre, the image distance increases by the square of 40 times as much, i.e. by 1.6 mm, and hence is substantial. Therefore as shown in FIG. 7(*b*) the focus position 104 changes to a new position 104', which is 1.6 mm further away from tube lens 56 and image plane 58. This is shown diagrammatically but not to scale for greater clarity and the original beam profile is shown dotted for comparison.

For aperture 112 at the position shown in FIG. 7(*b*), both the amount of light and its s:p ratio reaching polarization-sensitive detector 66 are reduced by the focus shift (or increased if the shift were in the other direction), but FIG. 7 shows that the reduction would be relatively greater for a smaller aperture 116 correspondingly closer to the original image position 104. Hence such a system can in principle be made more sensitive by using a small enough aperture that is close enough to position 104.

An alternative approach to increase sensitivity is to introduce further magnification into the system, as shown in FIG. 8 for a two-fold magnification where the beam angles have been significantly exaggerated for clarity. Only the region of the field near the reflected beam's image or focus position 104 needs to be magnified which can be achieved with a smaller and shorter focal length additional lens 118 that is relatively closer to primary image plane 58 than to detector 66. Whilst further magnification of perhaps of around five or tenfold can be used, the longitudinal magnification increase is relatively so great that a twofold further magnification is of substantial benefit.

FIG. 8 shows that after passing through additional lens 118, beam 40 is brought to a new focus position 120. Polarization-sensitive detector 66 is moved to be able to intercept all the light that reaches this new focus position. On account of the twofold magnification in this example, the beam convergence angle to focus position 120 is only half that to the original focus position 104. The longitudinal magnification effect means that the system is now more sensitive to small focus shifts.

This is explained further in more detail with reference to FIG. 9, which shows higher-resolution explanatory views using ray diagrams in the regions around focus point 104 as shown in FIG. 9(*a*) and focus point 120 as shown in FIG. 9(*b*). For clarity, the beam convergence near these focus points has been greatly exaggerated, but drawn to the same scale so that they can be directly compared.

FIG. 9(*a*) shows diaphragm 106 and associated aperture 112 near focus point 104, similar to the situation shown in FIG. 7(*a*), and where beam 40 just passes through aperture 112 as shown by the solid line beam profile. For a small focus shift resulting in half the amount of light passing through aperture 112, focus changes from position 104 to the new position 104', as shown by the dotted line.

For comparison, FIG. 9(*b*) shows the situation around focus point 120 of FIG. 8 with magnifying lens 118 for the same (object) focus shift as in FIG. 9(*a*), but where diaphragm 106 with aperture 112 has been replaced by diaphragm 130 with aperture 132 in the vicinity of focus point 120. The longitudinal magnification effect means that for the same object position shift as shown in FIG. 9(*a*), the focus position of beam 40 changes much more, from position 120 to the new position 120' as shown by the dotted line. Specifically, for a magnification of two from lens 118, this shift is four times greater than that between position 104 and 104' in FIG. 9(*a*). This means that for the same effect as shown in FIG. 9(*a*), diaphragm 130 needs to be four times further away from the (original) focus point 120, and its aperture 132 twice as great, for the same degree of occlusion of beam 40. Hence there is now correspondingly greater scope for increasing the sensitivity of the system, by moving diaphragm 130 correspondingly closer to focus point 120, and/or decreasing the size of aperture 132.

In FIG. 7, aperture 112 needs to be relatively small, such as a pinhole aperture, whereas aperture 132 in FIG. 9(*b*) is large enough to be provided by an adjustable diaphragm. If desired aperture 112 or aperture 132 can be replaced with an annulus or other opening with a central obscuration. The central region of beam 40 has roughly equal s and p polarization contributions. Hence obscuring the central region favours detection of the peripheral regions of the beam where the s and p contributions will be relatively more different, and so provide a relatively greater change in signal as the diameter of the beam changes.

The introduction of lens 118 as shown in FIG. 8 allows the additional magnification to be varied if required by interchanging lens 118 with one of different focal length, chosen such that the ratio of the image distance (from lens 118 to focus point 120) to the object distance (from focus point 104 to lens 118) gives the required magnification. With the focal length of lens 118 chosen such that the sum of the object and image distances remains the same, diaphragm 130 and aperture 132 can remain in the same position. Diaphragm 130 can be an iris diaphragm so that its aperture 132 can be varied.

If desired, illumination beam 74 generating the Fresnel reflection 40 can be polarized to control the relative contributions of s and p components within the beam. If the beam is polarized at 45° to the detected s and p directions, then its s and p contributions will be effectively equal, but as the angle is rotated either side of this value, either the s or the p states are progressively favoured. Polarization is of assistance because the detection system measures the relative values of the s and p states, and for detection it is preferable for the comparison to be made on s and p values in the reflected beam that are nearly equal. Polarization of the illumination beam is achieved by rotating the polarization angle of illumination beam 74 using a polarizer located between illumination source 70 and mirror 76.

For a given shift in focus, the absolute value of the difference will depend on the intensity of the illumination. If it is desired to quantify the difference between the s and p contributions of the coverslip reflected beam 40 that reaches polarization-sensitive detector 66 in respect of an absolute positional change, rather than just to use it as a feedback control signal to keep the focus constant, then the intensity must be kept constant as well.

One option for keeping the illumination intensity constant, is to have a further sensor that measures the illumination intensity at source 70, and which then stabilises it by an electronic feedback loop. As an alternative, the illumination can be controlled so that the sum of the s and p detected signal components remains constant which should have a broadly similar effect.

Another modification for use with the system if desired is using electronic background subtraction to remove any spurious signals resulting from any background light that may reach polarization-sensitive detector 66, or of any background signals within electronics associated with detector 66. This is achieved by switching or pulsing the illumination on and off at a relatively high frequency compared with the measurement bandwidth, which in this case means using a frequency of typically a few kilohertz. The detection of each of the s and p signals is itself made differentially, so that the level of each when the illumination is off is subtracted from that when the illumination is on. These signals can then easily be filtered in order to remove the switching frequency, so that they are then effectively continuous as seen by the subsequent detection electronics. This will allow use of a lower illumination intensity for a given level of performance, and hence a correspondingly lower risk of illumination beam 74 interfering with image sensor (s) 82 in any way.

The focus monitoring and control described requires just a single polarization-sensitive detector monitoring changes in s and p components from a single out-of-focus image. The change in polarization composition of the detected signal is used as a measure of any change in the position of the objective relative to the refractive index interface, and thus any change in the focus. Any change in polarization composition of the detected signal is used in a feedback control system to maintain a constant distance between the objective and the refractive index interface, such as the glass coverslip. This assists with speed of detection and correction of focus changes as less processing is required to quantify the changes in focus and the adjustments required to restore focus. The system also allows for sensitivity to be adjusted if desired by introducing a magnifying lens.

The invention claimed is:

1. A microscope focus control system comprising:

an illumination source, and a polarization-sensitive detector positioned to receive a reflected beam from an interface having a reference refractive index and configured to detect polarization components of the reflected beam, wherein an elongate rectangular aperture is disposed proximal the illumination source to generate a rectangular beam to impinge on the interface, a converging lens is located in the path of the reflected beam to focus the reflected beam towards the polarization-sensitive detector, and a second aperture is located at a position corresponding to an unfocused region of the reflected beam from the interface, between the converging lens and the polarization-sensitive detector, so that the extent to which the rectangular beam is occluded by the second aperture changes as the focus of the reflected beam changes, such that resulting changes in polarization components of the reflected beam are used as a measure of change in position of the interface relative to an objective.

2. A microscope focus control system according to claim 1, wherein the reflected beam is generated by Fresnel reflection.

3. A microscope focus control system according to claim 1 wherein the reflected beam is generated by specular reflection from a metallic surface, the reflection exhibiting polarization dependence.

4. A microscope focus control system according to claim 1, wherein changes in polarization components in the reflected beam are used to generate signals to control movement of microscope equipment.

5. A microscope focus control system according to claim 1, wherein the position corresponding to the unfocused region where the second aperture is located is further from the polarization-sensitive detector than a position corresponding to a focused region of the reflected light.

6. A microscope focus control system according to claim 1, wherein an illumination beam from the illumination source is polarized.

7. A microscope focus control system according to claim 1, wherein the illumination source is a laser diode.

8. A microscope focus control system according to claim 1, wherein the illumination source generates wavelengths in the infra-red.

9. A microscope focus control system according to claim 1, wherein the interface is an uncoated glass coverslip.

10. A microscope focus control system according to claim 1, wherein a magnifying lens is disposed between a focal point of the reflected beam and the polarization-sensitive detector.

11. A microscope focus control system according to claim 1, wherein the polarization-sensitive detector is locatable proximal an imaging sensor associated with a microscope.

12. A microscope focus control system according to claim 1, wherein a dichroic mirror is positioned between the interface and the polarization-sensitive detector.

13. A microscope focus control system according to claim 1, wherein the illumination source is of different wavelength to an imaging source associated with a microscope with which the system is to be used.

14. A microscope focus control system according to claim 1, further comprising a feedback control system responsive to changes in polarization components of the reflected beam to maintain a constant distance between an objective and the interface.

15. A microscope focus control system according to claim 1, further comprising an actuator moveable responsive to changes in polarization components of the reflected beam to maintain a constant distance between an objective and the interface.

16. A microscope focus control system according to claim 1 when retrofitted to a microscope system.

17. A microscope system incorporating a microscope focus control system according to claim 1.

* * * * *